Patented July 26, 1949

2,477,551

UNITED STATES PATENT OFFICE 2,477,551

METHOD OF PREPARING LOW ASH CONDENSATION PRODUCTS

Harold Wittcoff, Minneapolis, Minn., assignor to General Mills, Inc., a corporation of Delaware No Drawing. Application April 4, 1947, Serial No. 739,365

5 Claims. (Cl. 260—637)

The present invention relates to the production of low ash condensation products of polyhydric alcohols with alkylating agents.

In the production of highly functional polyhydric alcohols by condensing polyhydroxy compounds with either mono- or polyfunctional alkylating agents as described in the copending applications of Wittcoff and Roach, entitled Polyhydric alcohols, Serial No. 705,489, and Polyhydroxy compounds, Serial No. 705,491, both filed October 24, 1946, it is found that the products are highly polar and soluble only in polar solvents such as water, lower aliphatic alcohols, and the like. The condensation is conducted in the presence of caustic alkali, and as a result, the final mixture contains a mixture of salt and the highly functional alcohol from which the desired product is extracted with methanol. The inorganic salt, however, was slightly soluble in the methanol, and, in addition, its solubility is increased by the presence of the highly functional alcohol. As a result, the product which was obtained had an ash content of 4-5%.

In some applications of polyfunctional alcohols this ash content is not particularly detrimental. In other applications, however, it is desirable to have a substantially ash-free product, and it is to the preparation of such a product that the present invention is directed.

It is, therefore, an object of the present invention to provide a method of producing substantially ash-free highly functional alcohols resulting from the condensation of polyhydroxy compounds with mono- or polyfunctional alkylating agents.

As was pointed out above, the separation of the product from the inorganic material is not feasible by means of solvents in view of the extremely limited choice of solvents and in view of the fact that there are no particular solubility differences. It was found, however, that the highly functional alcohols could be readily converted to acetals by means of acidic solutions of aldehydes or ketones. The inorganic material was insoluble in the acidic solvent, and could thus be separated from the soluble acetals. Thereafter the acetals could readily be reconverted to the free polyfunctional compound in a substantially ash-free form.

The following description with reference to acetone, will serve to illustrate the invention. The mixture of inorganic material and polyfunctional alcohol may be mixed with acidic acetone. In some instances the polyfunctional alcohol may not completely dissolve in the acidic acetone. This is caused by the fact that some of the polyfunctional alcohols may not form acetals. In such instances the addition of a small amount of an alcohol such as methanol or ethanol, will serve to bring about the complete solution of the product without effecting solution of the inorganic material. The polyfunctional alcohols which do not form acetals are apparently soluble in the mixture of alcohol, acidified acetone, and acetals. The acidic acetone serves to convert the product, or at least a large part of it, into acetone-soluble isopropylidene derivatives which form readily and which likewise may be decomposed readily for recovery of the product. The inorganic material is insoluble in the acetone and can be removed by filtration, after which the acidic filtrate is treated with a small amount of water and then the water and acetone removed to regenerate the free alcohol. Since the acetone employed is acidic, it is desired in some cases to remove the acid. Hydrochloric acid serves very well for acidification of the acetone inasmuch as it may be readily vaporized by steam distillation.

Example 1

A mixture of pentaerythritol (136 parts) and aqueous sodium hydroxide (50%, 352 parts) was heated to 100° C. Thereafter, glycerol-alpha-monochlorohydrin (442 parts) was added to the stirred solution over a period of four hours. Heating and stirring were maintained for two hours longer, after which the reaction mixture was diluted with methanol, neutralized with concentrated hydrochloric acid and filtered. The filtrate was evaporated and from the mixture of salt and product which remained, the product was extracted with methanol. At this point it had an ash content of 8.7%. This material (20 parts) was stirred with acetone (100 parts) which contained five parts of anhydrous hydrogen chloride. The product dissolved almost immediately, whereupon the inorganic material was removed by filtration. To the filtrate was added five parts of water, and the volatile material was removed under reduced pressure to yield a product with an ash content of 0.15%.

Example 2

A mixture of glycerol (95%, 485 parts) and aqueous sodium hydroxide (50%, 880 parts) was heated to 90° C. and to the stirred solution was added glycerol dichlorohydrin (645 parts) over a period of five and one-half hours. The reaction was continued for one and one-half hours longer, after which the mixture was diluted with methanol and neutralized with concentrated hydrochloric acid. The mixture was filtered, and the filtrate evaporated to yield a mixture of salt and product. The product was extracted from the inorganic material with methanol and most of the glycerol which it contained was removed by distillation. The residue was taken up in methanol and filtered and the alcohol evaporated to yield a product with an ash content of 4.83%. This material (50 parts) was treated with acetone (100 parts) which contained one part of anhydrous hydrogen chloride. About two-thirds of the material dissolved on shaking. Thereafter, sufficient methanol was added to effect complete solution. The inorganic material was removed by filtration and the filtrate was subjected to steam distillation which was continued until the distillate was no longer acidic. Thus the acid present was readily removed. The water present because of the condensation of the steam was removed under reduced pressure to yield a product with an ash content of less than 1%.

While various modifications of the above invention have been described, it is to be understood that other variations may be made. For example, while acetone has been shown in the examples as the carbonyl compound for formation of the acetals, it will be apparent that any other aldehyde or ketone commonly used for the preparation of acetals may be substituted. Suitable carbonyl compounds include formaldehyde, acetaldehyde, propionaldehyde, methyl ethyl ketone, diethyl ketone, benzaldehyde, furfural, and the like. It is to be understood, therefore, that the invention is not limited to the specific details described herein, but may be varied within the scope of the following claims.

I claim as my invention:

1. Process of separating a mixture of polyhydroxy compounds from inorganic material dissolved therein, said polyhydroxy compounds resulting from the alkaline condensation of a polyhydric alcohol with an alkylating agent, which comprises converting at least part of the polyhydroxy compounds to acetals in a non-aqueous reaction mixture in which the inorganic material is insoluble, separating the insoluble inorganic material from the reaction mixture, and converting the acetals to the polyhydroxy compounds to recover the mixture of polyhydroxy compounds with a substantially reduced ash content.

2. Process of separating a mixture of polyhydroxy compounds from inorganic material dissolved therein, said polyhydroxy compounds resulting from the alkaline condensation of a polyhydric alcohol with an alkylating agent, which comprises reacting the mixture of polyhydroxy compounds containing dissolved inorganic material with acidified acetone in a non-aqueous reaction mixture to convert at least part of the polyhydroxy compounds to acetals in which the inorganic material is insoluble, separating the insoluble inorganic material from the acetals, and converting the acetals to the polyhydroxy compounds to recover the mixture of polyhydroxy compounds with a substantially reduced ash content.

3. Process of separating a mixture of polyhydroxy compounds from inorganic material in an aqueous reaction mixture resulting from the condensation of a polyhydric alcohol and an alkylating agent in the presence of an alkaline catalyst, which comprises removing water from the reaction mixture, extracting the resultant reaction mixture with a low aliphatic alcohol, removing the alcohol to leave a residue of polyhydroxy compounds containing dissolved inorganic material, treating the residue with acidified acetone in a non-aqueous reaction mixture in which the inorganic material is insoluble, to convert at least part of the polyhydroxy compounds to acetals, separating the insoluble inorganic material from the reaction mixture, and converting the acetals to the polyhydroxy compounds to recover the mixture of polyhydroxy compounds with a substantially reduced ash content.

4. Process of separating a mixture of polyhydroxy compounds from inorganic material dissolved therein, said polyhydroxy compounds resulting from the alkaline condensation of pentaerythritol with glycerol monochlorhydrin, which comprises converting at least part of the polyhydroxy compounds to acetals in a non-aqueous reaction mixture in which the inorganic material is insoluble, separating the insoluble inorganic material from the reaction mixture, and converting the acetals to the polyhydroxy compounds to recover the mixture of polyhydroxy compounds with a substantially reduced ash content.

5. Process of separating a mixture of polyhydroxy compounds from inorganic material dissolved therein, said polyhydroxy compounds resulting from the alkaline condensation of glycerol with glycerol dichlorhydrin, which comprises converting at least part of the polyhydroxy compounds to acetals in a non-aqueous reaction mixture in which the inorganic material is insoluble, separating the insoluble inorganic material from the reaction mixture, and converting the acetals to the polyhydroxy compounds to recover the mixture of polyhydroxy compounds with a substantially reduced ash content.

HAROLD WITTCOFF.

REFERENCES CITED

The following references are of record in the file of this patent:

UNITED STATES PATENTS

| Number | Name | Date |
|---|---|---|
| 2,223,421 | Hubacher et al. | Dec. 3, 1940 |

OTHER REFERENCES

Kraft, Chem. Abstracts, 25, 5114 (1931) (Abstract of J. Chem. Ind. (Moscow), 8, 507 (1931)).